March 4, 1947.  G. W. CURTIS  2,416,679
JOINTLESS TRACKLAYER SUSPENSIONS
Filed March 1, 1943  3 Sheets-Sheet 1

INVENTOR.
George W Curtis
BY

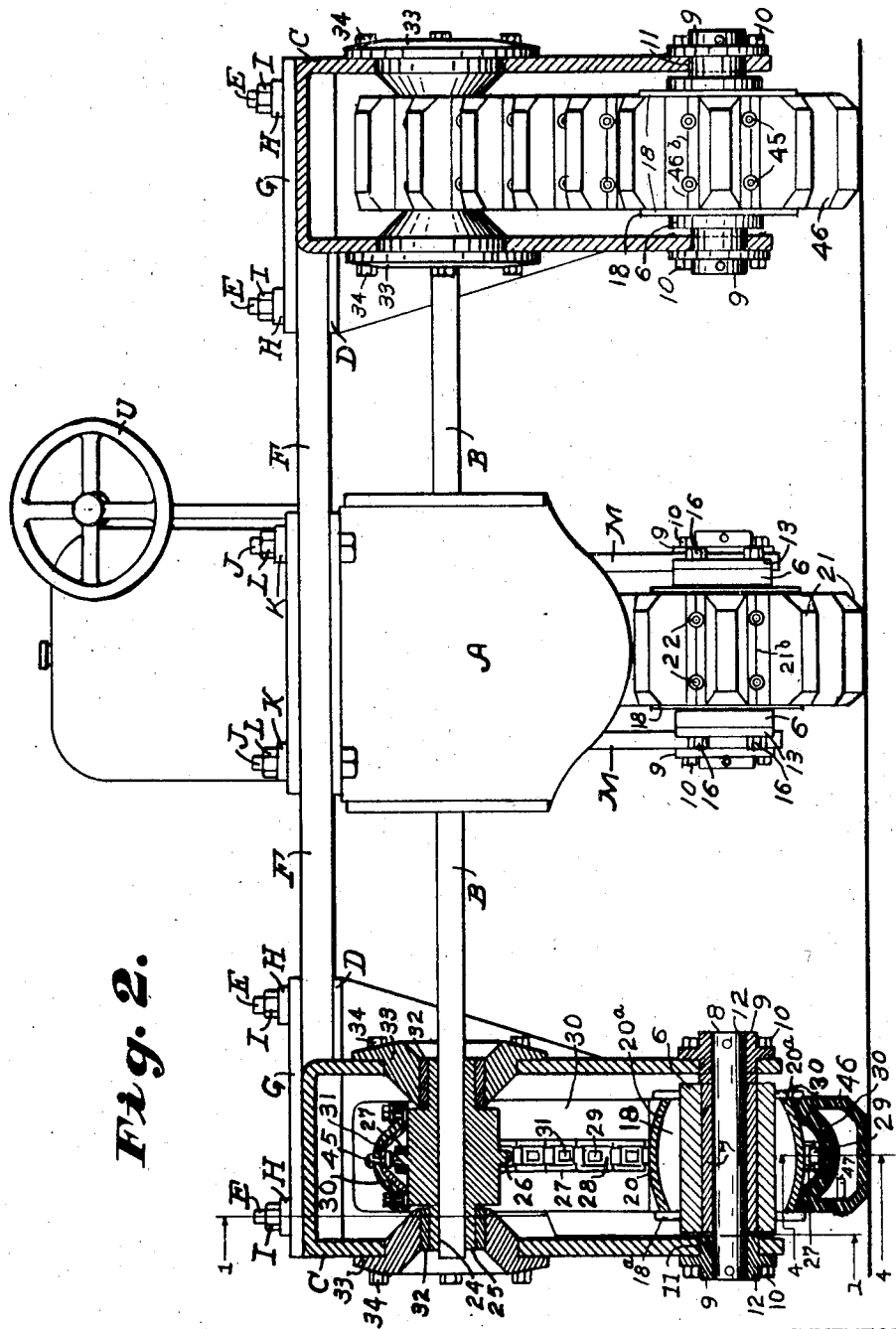

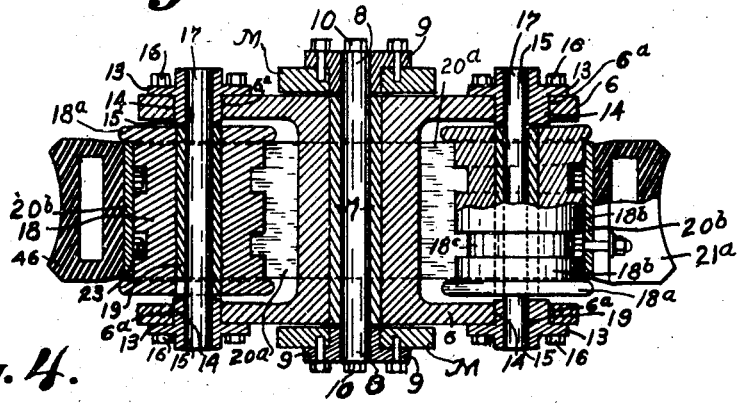
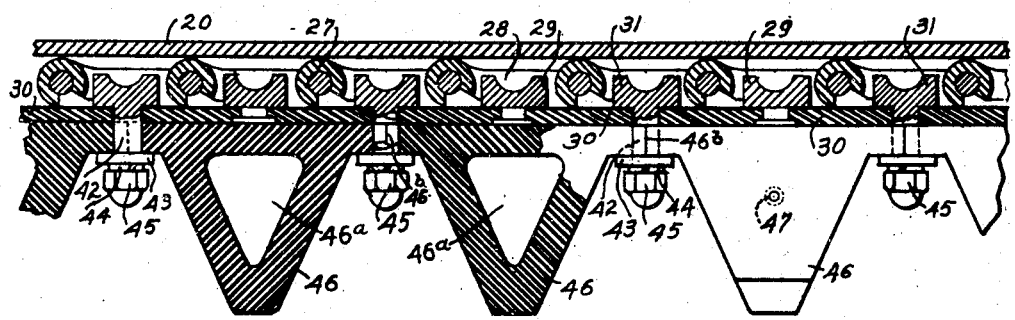
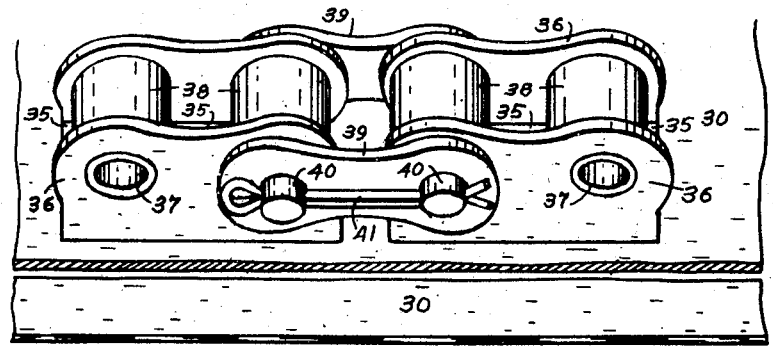
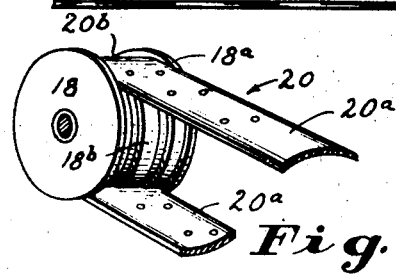

Patented Mar. 4, 1947

2,416,679

UNITED STATES PATENT OFFICE 2,416,679

JOINTLESS TRACKLAYER SUSPENSION

George W. Curtis, Wauwatosa, Wis.

Application March 1, 1943, Serial No. 477,559

19 Claims. (Cl. 305—9)

This invention relates to means for sustaining moving machinery, vehicles, airplanes or other devices on surfaces which hitherto may not have been considered suitable to the purpose. Heretofore some existing form of tracklayer or wheel has been in use. Heavy vehicles on improved surfaces and both heavy and light vehicles on soft surfaces may require tracklayer track suspension having considerable length and breadth of track to distribute the load over large surface areas, thus obtaining reduced contact pressures. But known tracklayer suspensions are attached to an inherently rigid frame and the frame has conveniently been rigidly attached to its vehicle. Thus in conventional construction no compensation or self-adjustability has been provided for irregular terrain where supporting surfaces are in more than one plane. In such cases the track contact areas may be greatly reduced, the load per unit of area greatly increased and the original purpose of the large track area defeated. Furthermore at such times when the entire track area may have full supporting surface contact a great resistance is created to steering necessitating an especially heavy steering type of differential. Thirdly, the rigidity of tracklayer attachment aforementioned places a handicap on vehicle operation under conditions of heavy draw bar pull and vehicle weight transfer. Under this condition the vehicle lifts its front end and concentrates all the weight undesirably on the rearmost areas of the track. Lastly tracklayers in current use consists of a plurality of shoes, joints, link pins, track rollers and other parts of considerable weight such that inefficiency of operation, great maintenance expense and difficulty at high speeds results.

Pneumatic tired wheels having greatly reduced contact areas may be used at higher speeds. Under the heavy loads and high unit contact pressures effective under a large airplane however the runway may give way or the tires may blow out and cause plane wrecks as well as expensive tire replacements.

One of the objects of this invention is to discover a jointless track having that inherent compensating flexibility to permit a track supporting unit to have the function of maintaining maximum areas of track in contact with the supporting surfaces and of equalization of unit surface pressures.

Another object of the invention is to provide for using the track contact area so efficiently as to require a great deal less area than conventional tracks and to eliminate the difficulty of steering a vehicle so equipped thus making it possible to use a simplified means of steering said vehicle.

Another object is to provide withal a jointless tracklayer track having inherent rigidity to external pressure for the suspension of heavy loads.

Another object is to discover a tracklayer track more suitable to operation at high speeds.

Another object is to provide a new type of tread application to tracklayer tracks which may be replaced in segments or sections.

Another object is to provide a new type of pneumatic suspension in segments or sections having individually self contained pneumatic chambers for improved safety and economy.

Other objects are to provide self containment in the construction of the tracklayer unit assemblies to provide transverse vehicular unit adjustabiltiy to a variety of vehicular tread widths, to also provide rotatability of unit about a vertical axis for purposes of steering a vehicle and to attain the foregoing objectives at a cost greatly reduced over current construction.

In the accompanying drawings, which form part of this specification and wherein the like symbols refer to like parts wherever they occur.

Figure 2 is a transverse elevation of a vehicle, partly in outline, with a part of the idler suspension unit assembly shown in elevation in the lower central portion, and with identical propelling type suspension unit assemblies shown at the extreme right and left, the unit at the left being illustrated in section, with said section taken on the line 2—2 of Figure 1.

Figure 3 is a horizontal transverse section on line 3—3 of Figure 1.

Figure 4 shows a short length of section on line 4—4 of Figure 2.

Figure 5 shows a short length of driving mechanism which may be incorporated as an alternate to that of Figure 4 to be later described.

Figure 6 is a fragmentary perspective view illustrating a portion of the endless track-supporting belt as it passes around one of the rollers.

Figure 1:
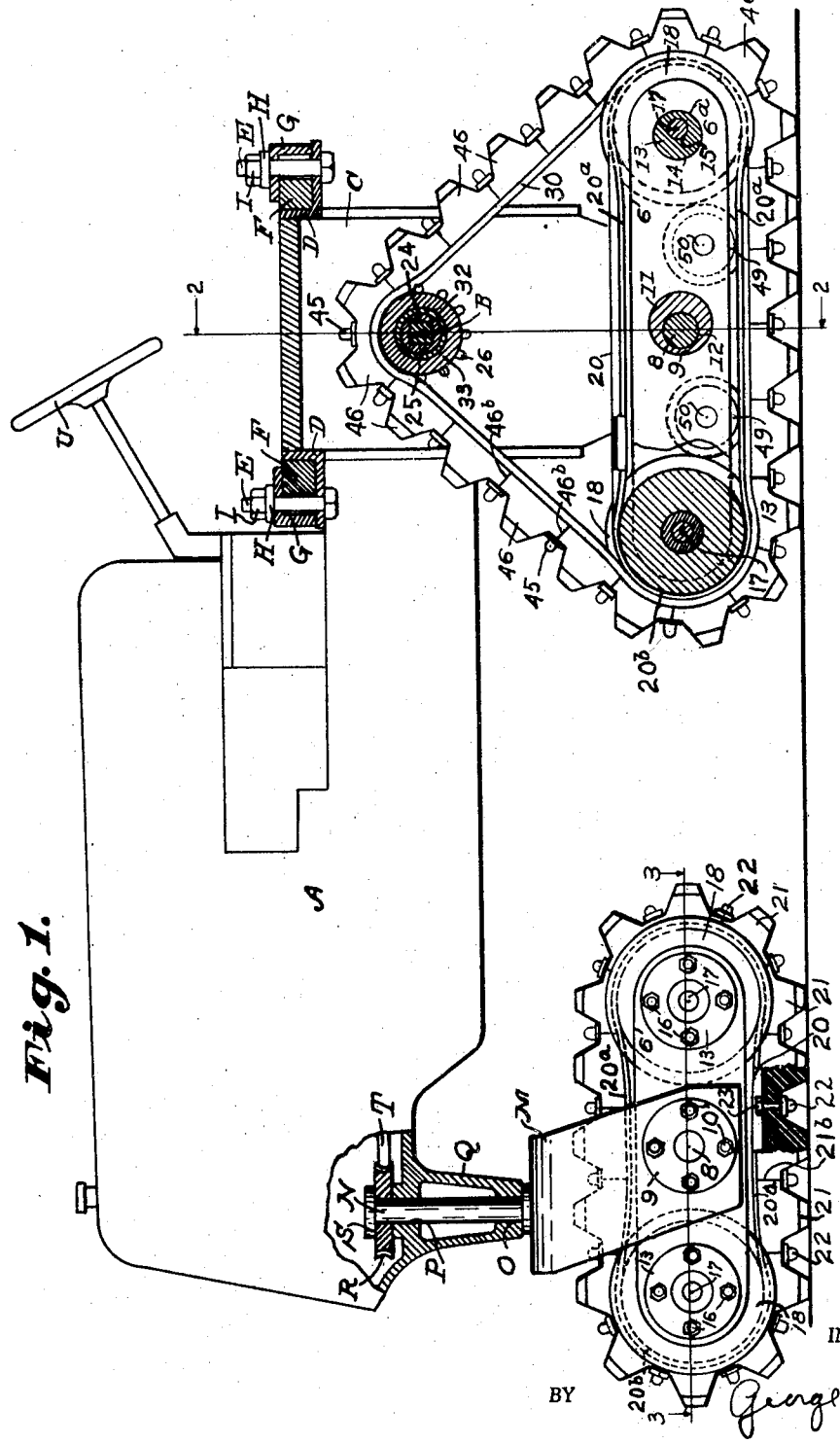
Figure 1 is a side elevation of a vehicle with a suspension unit assembly of the idler tracklayer type partly in sections at the left, a suspension unit assembly of the propelling type partly in section at the right to be later described.

In Figures 1 to 5 inclusive of the accompanying drawings, the main body and power generating unit of a vehicle is shown in outline A. This unit A provides means of rotating and transmitting torque at proper speeds to power shafts B—B and to the internal parts contained and supported by the spaced and similar frames C—C. The groups of parts carried by frames C—C comprise two similarly constructed tracklayer propelling type units and will be hereinafter referred to as units C—C. Units C—C have permanently attached thereto angle irons D—D—D—D and projecting therethrough are bolts E—E—E, etc. Resting on angles D—D—D—D are main truss members F—F and clamped thereto are members G—G—G—G by washers H—H—H—H and nuts I—I—I—I. Studs J—J and washers K—K and nuts L—L provide means of rigidly attaching truss members F—F to power unit A and of maintaining C—C in the relative positions desired. The construction however provides for releasing the clamping action of members G—G—G—G by loosening nuts I—I—I—I, etc., and sliding units C—C transversely along truss members F—F to any desired positions thereof. Shafts B—B have slidable connections and may telescope through units C—C.

Another tracklayer unit is carried by frame member M having a group of parts contained therein and referred to hereinafter as unit assembly M. This unit M comprises a non propelling tracklayer unit and is fixed to the lower end of shaft N carried in the cylindrical apertures O, P in housing Q of power unit A. Keyed to the upper end of shaft N is a worm gear R. Meshing therewith is a worm S which is keyed to shaft T which has in turn a torque connection with steering wheel U thus providing steering control of unit M and the vehicle. The frame members C—C may be adjustable to a variety of transverse positions and the frame member M may be rotatable at will around a vertical axis as described but said frame members C—C and M otherwise are intended to be rigid load carrying elements with an essentially rigid attachment to a vehicle. Said frames C—C and M are hereinafter referred to as frames of the main type or first type. Other frames hereinafter identified as sub frames 6—6—6 and referred to alternately as the second type of frame are pivotally suspended on transverse mountings in each of the main or first frames C—C and M. The pivotal suspension of said second type frame may be required by reason of the inherently stiff or rigid nature of a track or band carried on rotatable supports by said second frame to be later described.

Having like functions and symbols and being common to units C, C and M is sub frame 6 having transversely in its midsection an aperture for bearing 7 tightly affixed therein and having a free rotative fit on a shaft 8. Each sub frame 6 may pivot or oscillate freely in a fore and aft direction around the transverse axis of shaft 8 by reason of the said free rotative fit of bearing 7 on shaft 8. Shaft 8 is carried in adapters 9—9 attached to frames C, C and M respectively by screws 10—10—10—10, etc. In each extremity of sub frame 6 are transverse apertures 6a—6a which carry adapters 13—13 attached by cap screws 16—16—16—16, etc., to sub frame 6. Carried by adapters 13—13 are shafts 17—17 and rotatively mounted thereon are rollers 18—18 having integral end flanges 18a—18a—18a—18a extending in a radial manner, equal diameter cylindrical outer surfaces 18b—18b—18b, etc., therebetween and annular grooves 18c—18c intermediate said flanges. Central apertures of rollers 18—18 contain bearings 19—19 which have a free rotative fit on shafts 17—17. Between and around the remote cylindrical portions 18b—18b of rollers 18—18 is a continuous band 20. A strip of metal, of any type suitable to the purpose, having a continuous straight lengthwise and inherently curved transverse form similar to a length cut axially from a long cylinder or pipe, with sides parallel to the axis, may comprise band 20 said strip having its ends joined together to form a continuous band and said band adapted to conform to alternate straight and curved lengthwise portions. The said straight lengthwise portions shall retain their inherent curved transverse form having a transverse concave inner surface and a transverse convex outer surface. The said curved lengthwise portions may assume any transverse form natural to this type of band under the flexed lengthwise condition and the metallurgical properties of the said band shall be similar to a spring of returning after deflection to the original transverse form. Band 20 may be considered jointless when a transversely curved strip of the type described shall have its ends joined or held in proper relationship by any method suitable to the purpose and said band 20 may have a coating of rubber or plastic material of any desired thickness, smoothness or roughness on any or all surfaces as a means of protection against undue wear or corrosion and contact with the ground or other supporting surface. The characteristics to lengthwise bending inherent in any straight lengthwise portion of band 20 having the convex transverse curved surface placed as the inside surface of the bend are to offer great resistance thereto, because the proper transverse curvature will cause deflection to a point of a permanent set in the material before bending. But lengthwise bending in any lengthwise portion of band 20 having the concave transverse curved surface placed as the inside surface of the bend may occur with very little effort. The lengthwise fibers of the inner surface of band 20 upon the formation of such latter type of lengthwise bend will assume positions equally distant from the transverse axis of said lengthwise bend or curve and other fibers at various corresponding depths below said surface will likewise assume positions of equal radius from said transverse axis which is to say that the formation in any straight lengthwise portion of band 20 of a lengthwise bend or curve creates simultaneously a change of form from curved to straight transverse sections throughout said portions of lengthwise curvature. The band 20 is formed of a strip of metal of any type suitable for the purpose, which is inherently curved in transverse section; and the strip may have its ends suitably secured together to render the member endless. The curvature is so formed as to present a transversely convex outer surface and a transversely concave inner surface on those stretchers of the band which extend in straight lines between the rollers 18 as illustrated in Figure 6. Due to the fact that the metallurgical properties of the band are similar to that of a spring, a portion of the band will change to a straight transverse section when passing around one of the rollers 18, and will immediately return to the curved cross-sectional form as it leaves the roller and enters the straight line stretch between the rollers. Inasmuch as the transverse curvature is convex in an outward direction, the straight stretches of the band have great resistance to external forces which might tend to deflect these straight stretches inwardly during use. The band 20 as it changes from its curved cross-sectional form to the straight cross-sectional form, 20b—20b in passing around the rollers 18, follows and contacts the cylindrical outer surface portions 18b of the rollers 18. In operational movement, however, the band inherently reforms itself into the curved or trough-like cross-section as it leaves the rollers and enters the straight line stretches. Rollers 49 rotatably mounted on suitable bearings (not shown) on shafts 50 and carried in the subframe 6 may be incorporated as a part of subframe 6 to conform transversely to the inherently reformed concave inner surface of the band 20 and to offer backing support thereto. The inherent nature of the band 20 therefore is to flex in lengthwise arced portions 20b having essentially straight coincidental transverse section, to closely conform at roller contact to the cylindrical surfaces 18b, and automatically reform into the straight stretches 20a having coincidental transverse troughlike section. The band therefore transforms itself from a state of flexibility as it passes around the rollers to a state of relative rigidity against inward pressure. Thus the straight stretches of the band provide an extremely rigid structure to support or resist external loads, and these loads are well distributed over a relatively large area of the band. In addition the band serves to equalize the unit pressures. Extending from adapters 13—13 are axial hub sections having outside diameters 14—14 with eccentricity to their bores 15—15. The eccentric outside diameters 14—14 of the hub sections of adapters 13—13 fit with a slight looseness into the transverse cylindrical apertures 6a—6a in sub frame 6. Adapters 13—13 may be rotated in the apertures 6a—6a and locked by screws 16—16—16—16 in a new position thereof. This causes shaft 17 to approach or recede from the other shaft 17 in opposite end of frame 6, thus providing a means of moving rollers 18—18 in like manner and of controlling the amount of slackness or tautness of band 20 as desired. Band 20 may travel between and around the remote cylindrical portions of rollers 18—18 in either direction being restrained only in a transverse manner by flanges 18a—18a. The group of assembled parts hereinafter identified as sub unit assembly 6 and consisting of sub frame 6, bearing 7, adapters 13—13—13—13 holding screws 16—16—16 etc. shafts 17—17, rollers 18—18, bearings 19—19, rollers 49—49, shafts 50—50 and band 20 by reason of the power to pivot or oscillate around shaft 8 comprise a self oscillating unit adapted to maintain the entire projected area of the lower chordal portion 20a of band 20 effectively supporting the sustained load and also effectively equalizing the unit contact pressures thus constituting definite dependent cooperation between the said pivotal suspension of frame 6 of the said one way rigidity of band 20 and the adjustability of said roller 18 to maintain rigidity of the chordal portions 20a—20a and achieve the objects aforesaid. To the outer convex surface of band 20 in sub assembly unit 6 of unit M there may be a series of tread cushions 21—21 applied in sections having fore and aft extent indicated by edges 21b—21b or as a continuous tread surfaced band as the case may be. The cushions 21—21 may be flexible material of solid section or may have provision for pneumatic chambers as desired. The partially sectioned cushions 21—21—21, etc., of Figure 1 are shown as solid treads whereas 21a—21a—21a, etc., of Figure 3 are shown as alternate type of pneumatic treads. It is intended that such pneumatic chambers may be arranged with a separate valve for each section or chamber to provide for maintaining pressure independently of other sections or chambers as required. The tread cushions 21—21 may have a means of attachment to band 20 such as nuts 22—22 threaded on screws 23—23 which may be attached to band 20 or may project therethrough with heads on the inside. Each segment sector or continuous band as desired of treads 21—21—21, etc., and 21a—21a—21a, etc. may be removable by releasing the nuts without disturbing the balance of the tread parts. Thus in event of damage to one of the tread cushions and failure thereof no failure of the balance of the tread will necessarily follow and the damaged section may be individually repaired or replaced. The group of parts contained by frames C—C comprise the means of propelling the vehicle. A torque transmitting shaft B may have a driving engagement with a conforming female aperture 24 in a driving sprocket 25 having external sprocket teeth 26 projecting radially therefrom. Teeth 26 engage the links of a chain 27 by projecting into the rectangular apertures 28. The apertures 28 as illustrated in Figures 2, 4 and 5 also engage a series of blocks 29 and 31 projecting inwardly from the internal surface of belt 30. The blocks 29, 31 remain in the apertures 28 throughout the travel of belt 30 except when they pass over the teeth 26 of sprocket 25. As each tooth 26 enters aperture 28 it ejects the block 29 or 31 a function permitted by a certain elasticity of belt 30 which returns blocks 29 and 31 to their proper apertures upon the withdrawal of sprocket teeth 26. Sprocket 25 is supported on bearings 32—32 pressed tightly into adapters 33—33 attached by screws 34—34—34, etc., to frame C. Each block 31 comprises the head of a bolt 42 projecting through belt 30 and together with the alternately positioned blocks 29—29—29, etc., comprise the means of driving belt 30 as shown most clearly in Figures 2, 4 and 5 as previously described. Bolts 42—42—42, etc., with plates 43—43—43, etc., washers 44—44—44, etc., and nuts 45—45—45, etc., may be the means of attaching a series of tread cushions 46—46—46, etc., to belt 30. The tread cushions 46—46—46, etc., may be a plurality of cushions on a band of flexible material of solid section or may have provision for individual pneumatic chamber 46a having fore and aft edges 46b—46b and valve 47 individually valved and detachable. Belt 30 is adapted to travel in a triangular path flexing around sprocket 25 and rollers 18—18 in the extremities of sub unit 6 enveloping band 20, contacting the supporting surface and thereby providing the traction required to propel the vehicle. Flexibility of belt 30 is a particularly important requirement to permit sub assembly unit 6 freedom to pivot or oscillate around shaft 8 and thereby equalize unit track contact pressures. Belt 30 may be of greater transverse curvature at the center section to provide operating space for chain 27, blocks 29 and 31 between band 20 and belt 30 but closely follows the contour of band 20 on either side of chain 27. The chain 27 may be of the detachable type illustrated in Figures 2 and 4 and as used extensively for low speed work. A roller chain as illustrated in Figure 5 may however be substituted for high speed work having anchor plates 35 riveted or otherwise attached to belt 30. Extending radially from plates 35 are ears 36 which support fixed bushings 37—37 and free rollers 38—38. The anchor plates 35—35 are all connected to form a continuous chain by link members 39—39 supported on the extended ends of transverse pins 40—40 and locked thereon by cotter pin 41. A driving sprocket of suitable type, size, position and function will engage the roller bushings 38—38 in the usual manner, propelling belt 30 and exerting tractive effort on the supporting surfaces, through any treads or tread cushions as may be attached thereto. The slackness may be taken out of belt 30 by a downward adjustment of sub assembly unit 6. Sub unit 6 is supported on shaft 8 which in turn is carried in bores 12—12 of adapters 9—9. The outside diameters 11—11 of the axially extending hubs of adapters 9—9 are considerably eccentric with the bores 12—12. Therefore, the raising or lowering of sub unit 6 is accomplished by rotating adapters 9—9 in the bores 51—51 of frame C and locking in desired positions by screws 10—10—10, etc. A single track or band 20 of the inherently curved transverse supporting type having treads applied to the outer surface thereof is herewith disclosed in the sub assembly unit 6 of unit M in Figures 1, 2 and 3 applied as an idler tracklayer type of unit. A double track consisting of the inherently curved transverse supporting band 20 enveloped by a second flexible track or belt 30 constructed to permit free pivotal oscillation of the suspending means of and to conform transversely to band 20 is also disclosed in the units C—C of Figures 1, 2 and 4 and applied as a propelling means on a propelling type of track layer unit. The propelling track 30 supported by track 20 functions to propel and at the same time provides the flexibility to allow for pivotal action of sub unit assembly 6 for the automatic maintenance of maximum track areas under load as well as for the equalization of unit track pressures requiring the flexing of belt 30, the pivotal suspension of sub unit 6 and the inherent one way rigidity of band 20 as functional cooperative action to accomplish these purposes and comprising dependent cooperation thereof.

The foregoing disclosures of this invention are all inseparably related such that the degree of benefit obtained from each is definitely dependent upon the others. Furthermore, the hereinbefore described track and tracklayer unit obviously admits of considerable modification without departing from the invention. Therefore, I do not wish to be limited by the precise position, shape or arrangement of parts shown and described. As to features shown and described herein but not claimed, reference is made to copending applications, Serial No. 554,193, filed September 15, 1944, for Tracklaying unit, and Serial No. 564,303, filed November 20, 1944, for Tractors.

What I claim is:

1. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, and ground engaging means movable with the band and braced against inward pressures by one of the straight stretches of said band.

2. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, and ground engaging means including a plurality of tread elements movable with the band and braced against inward pressures by one of the straight stretches of said band.

3. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, ground engaging means movable with the band and braced against inward pressures by one of the straight stretches of said band, and roller means supported within said frame and engageable with the inner side of a straight ground engaging stretch of said band to furnish further support against inward pressures.

4. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, and ground engaging means of resilient material movable with the band and conformable to changes in cross-sectional shape of the band and braced against inward pressures by said band.

5. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, and ground engaging means of resilient material movable with the band and conformable to changes in cross-sectional shape and longitudinal extent of the band and braced against inward pressures by said band.

6. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, and ground engaging means, including a plurality of tread elements connected to the outer surface of the band and braced against inward pressures by said band.

7. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, and flexible pneumatic ground engaging means movable with the band and braced against inward pressures by said band.

8. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, and flexible pneumatic ground engaging means connected to the outer surface of the band and braced against inward pressures by said band, the inner side of said ground engaging means being sufficiently resilient to conform to changes in the cross-sectional shape of the band.

9. An endless tracklaying unit comprising a frame, spaced rollers having circumferential grooves rotatably mounted on said frame, an endless metal band supported by said spaced rollers, said band having straight stretches extending between the rollers and having longitudinally curved portions cooperable with the rollers, said band being inherently curved in cross-section to present a transversely convex outer surface and a transversely concave inner surface on the straight stretches and having the inherent characteristic of temporarily changing to a straight cross-section at its longitudinally curved portions which cooperate with the rollers, ground engaging means movable with the band and braced against inward pressures by said band, and members connecting said ground engaging means to the band and having parts projecting through the band and received in the grooves of the rollers as the band moves therearound.

10. An endless tracklaying member comprising a frame, three spaced guiding members rotatably mounted on said frame, an endless tread member trained around said guiding members, the latter being so disposed as to cause the tread member to present three relatively straight stretches forming a triangle with one of said straight stretches engageable with the ground, means for imparting driving movement to said tread member, and an endless metal band trained around at least two of said guiding members and having a straight stretch positioned inside of and movable with the ground engaging stretch of the tread member, said band being inherently curved in cross-section to present a transversely convex outer surface and a transversely concave inner surface on its straight stretches to brace the ground engaging stretch of the tread member against inward pressures, and said band having the inherent characteristic of temporarily changing to a straight cross-section at its longitudinally curved portions which cooperate with the guiding members.

11. An endless tracklaying member comprising a frame, a pair of spaced rotatable guiding members rotatably mounted on said frame in substantially the same horizontal plane, a driven guiding member rotatably mounted in the frame between said pair, an endless tread member trained around said three guiding members with the driven guiding member so disposed as to cause the tread member to present three relatively straight stretches forming a triangle with one of said straight stretches engageable with the ground, means for causing said driven guiding member to drive said tread member, an endless metal band trained around at least two of said guiding members and having a straight stretch positioned inside of and movable with the ground engaging stretch of the tread member, said band being inherently curved in cross-section to present a transversely convex outer surface and a transversely concave inner surface on its straight stretches to brace the ground engaging stretch of the tread member against inward pressures, and said band having the inherent characteristic of temporarily changing to a straight cross-section at its longitudinally curved portions which cooperate with the guiding members.

12. An endless tracklaying member comprising a frame, a pair of spaced rotatable guiding members rotatably mounted on said frame in substantially the same horizontal plane, a driven guiding member rotatably mounted in the frame between said pair, an endless tread member trained around said three guiding members with the driven guiding member so disposed as to cause the tread member to present three relatively straight stretches forming a triangle with one of said straight stretches engageable with the ground, means for causing said driven guiding member to drive said tread member, an endless metal band trained around the two guiding members which are in the same horizontal plane and having a straight stretch positioned inside of and movable with the ground engaging stretch of the tread member, said band being inherently curved in cross-section to present a transversely convex outer surface and a transversely concave inner surface on its straight stretches to brace the ground engaging stretch of the tread member against inward pressures, and said band having the inherent characteristic of temporarily changing to a straight cross-section at its longitudinally curved portions which cooperate with the guiding members.

13. An endless tracklaying member comprising a frame, a pair of spaced rotatable guiding members rotatably mounted on said frame in substantially the same horizontal plane, a driven guiding member rotatably mounted in the frame between said pair, and endless tread member trained around said three guiding members with the driven guiding member so disposed as to cause the tread member to present three relatively straight stretches forming a triangle with one of said straight stretches engageable with the ground, means including an endless driving member movable with the tread member and driven by said driven guiding member for causing movement of said tread member, an endless metal band trained around at least two of said guiding members and having a straight stretch positioned inside of and movable with the ground engaging stretch of the tread member, said band being inherently curved in cross-section to present a transversely convex outer surface and a transversely concave inner surface on its straight stretches to brace the ground engaging stretch of the tread member against inward pressures, and said band having the inherent characteristic of temporarily changing to a straight cross-section at its longitudinally curved portions which cooperate with the guiding members.

14. An endless tracklaying member comprising a frame, a pair of spaced rotatable guiding members rotatably mounted on said frame in substantially the same horizontal plane, a driven guiding member rotatably mounted in the frame between said pair, an endless tread member trained around said three guiding members with the driven guiding member so disposed as to cause the tread member to present three relatively straight stretches forming a triangle with one of said straight stretches engageable with the ground, means including an endless driving member movable with the tread member and driven by said driven guiding member for causing movement of said tread member, and endless metal band trained around at least two of said guiding members and having a straight stretch movable with the ground engaging stretch of the tread member with the endless driving member positioned between the tread member and said band, said band being inherently curved in cross-section to present a transversely convex outer surface and a transversely concave inner surface on its straight stretches to brace the ground engaging stretch of the tread member against inward pressures, and said band having the inherent characteristic of temporarily changing to a straight cross-section at its longitudinally curved portions which cooperate with the guiding members.

15. An endless tracklaying member comprising a frame, a pair of spaced rotatable guiding members rotatably mounted on said frame in substantially the same horizontal plane, a driven guiding member rotatably mounted in the frame between said pair and having sprocket teeth thereon, an endless tread member trained around said three guiding members with the driven guiding member so disposed as to cause the tread member to present three relatively straight stretches forming a triangle with one of said straight stretches engageable with the ground, an endless sprocket chain movable with the tread member and driven by the sprocket teeth of the driven guiding member for causing movement of said tread member, an endless metal band trained around at least two of said guiding members and having a straight stretch positioned inside of and movable with the ground engaging stretch of the tread member, said band being inherently curved in cross-section to present a transversely convex outer surface and a transversely concave inner surface on its straight stretches to brace the ground engaging stretch of the tread member against inward pressures, and said band having the inherent characteristic of temporarily changing to a straight cross-section at its longitudinally curved portions which cooperate with the guiding members.

16. An endless tracklaying unit for use on a vehicle comprising a frame, spaced guiding members rotatably mounted on said frame, an endless metal band supported by said spaced guiding members, said band having straight stretches extending between the guiding members and having longitudinally curved portions cooperable with the guiding members, said band being inherently curved in cross-section to present a transversely convex outer surface and a transversely concave inner surface on the straight stretches, and said band having the inherent characteristic of temporarily changing to a straight cross-section at its longitudinally curved portions which cooperate with the guiding members, ground engaging means movable with the band and braced against inward pressures by one of the straight stretches of said band, and means for adjustably varying the distance between said spaced guiding members to maintain a required tautness in said band.

17. An endless tracklaying member comprising a frame a pair of spaced rollers rotatably mounted on said frame in substantially the same horizontal plane, a driven roller rotatably mounted in the frame between said pair and having sprocket teeth thereon, an endless tread member trained around said three rollers with the driven roller so disposed as to cause the tread member to present three relatively straight stretches forming a triangle with one of said straight stretches engageable with the ground, an endless sprocket chain movable with the tread member and driven by the sprocket teeth of the driven roller, lugs projecting inwardly from said tread member and engageable with the sprocket chain whereby the tread member is driven by said chain, and an endless metal band trained around at least two of said rollers and having a straight stretch positioned inside of the sprocket chain and movable with the sprocket chain and ground engaging stretch of the tread member, said band furnishing support against inward pressures.

18. An endless tracklaying unit for use on a vehicle comprising a frame, spaced guiding members rotatably mounted on said frame, an endless metal band supported by said spaced guiding members, said band having stretches extending between the guiding members at least one of which is normally horizontal and having longitudinally curved portions cooperable with the guiding members, said band being inherently curved in cross section to present a transversely convex outer surface and a transversely concave inner surface on the stretches between the guiding members, and said band having the inherent characteristics of temporarily changing to a straight cross section at at least some of its longitudinally curved portions which cooperate with the guiding members, and ground engaging means movable with the band and braced against inward pressures by a normally horizontal stretch of said band.

19. An endless tracklaying unit for use on a vehicle comprising a frame, spaced guiding members rotatably mounted on said frame, an endless metal band supported by said spaced guiding members, said band having stretches extending between the guiding members at least one of which is normally horizontal and having longitudinally curved portions cooperable with the guiding members, said band being inherently curved in cross section to present a transversely convex outer surface and a transversely concave inner surface on the stretches between the guiding members, said band having the inherent characteristics of temporarily changing to a straight cross section at at least some of its longitudinally curved portions which cooperate with the guiding members, and ground engaging means movable with the band and braced against inward pressures by a normally horizontal stretch of said band, and a rotatable member engaging the inner side of said last-mentioned stretch of the band intermediate the length of said stretch to furnish further support against inward pressure.

GEORGE W. CURTIS.

REFERENCES CITED

The following references are of record in the file of this patent:

UNITED STATES PATENTS

| Number | Name | Date |
| --- | --- | --- |
| 2,254,787 | Aukland | Sept. 2, 1941 |
| 2,306,577 | Walker | Dec. 29, 1942 |
| 2,273,949 | Galanot et al. | Feb. 24, 1942 |
| 1,986,865 | Tschappat | Jan. 8, 1935 |
| 380,077 | Barrie | Mar. 27, 1888 |
| 1,507,458 | Dreyer | Sept. 2, 1924 |
| 1,933,018 | Jobe | Oct. 31, 1933 |
| 2,126,240 | Bergh | Aug. 9, 1938 |
| 2,109,256 | Potter | Feb. 22, 1938 |
| 1,512,152 | White | Oct. 21, 1924 |